United States Patent [19]
Hicks et al.

[11] Patent Number: 5,850,902
[45] Date of Patent: Dec. 22, 1998

[54] TRANSFERRING ARTICLES FROM A MOVING BELT EDGE ONTO A NORMALLY DISPOSED MOVING CONVEYOR BELT

[75] Inventors: Timothy J. Hicks, Ponchatoula; David W. Bogle, River Ridge; Scott J. Sirgo; Christopher G. Greve, both of Covington, all of La.

[73] Assignee: The Laitram Corporation, Harahan, La.

[21] Appl. No.: 838,320

[22] Filed: Apr. 8, 1997

Related U.S. Application Data

[63] Continuation of Ser. No. 541,032, Oct. 6, 1995.
[51] Int. Cl.$^6$ ..................................... B65G 47/26
[52] U.S. Cl. ........................... 198/457; 198/599; 198/853
[58] Field of Search .................................. 198/457, 599, 198/600, 803.01, 851, 853

[56] References Cited

U.S. PATENT DOCUMENTS

| 1,966,659 | 7/1934 | Wynne et al. . | |
| 3,643,781 | 2/1972 | Risley et al. | 198/600 |
| 5,167,319 | 12/1992 | McMackin, Jr. . | |
| 5,551,554 | 9/1996 | Wilson et al. . | |
| 5,634,550 | 6/1997 | Ensch et al. | 198/457 |

FOREIGN PATENT DOCUMENTS 0722896  11/1995  European Pat. Off. .

Primary Examiner—Joseph E. Valenza

[57] ABSTRACT

This invention provides improvements in modular links and conveyor belt systems for transferring moving articles from one conveyor belt to another disposed at ninety degrees. Thus a transferring belt has specially constructed links with two integrally formed portions across the width, one for pivotable connection in a moving belt configuration and the other specially constructed with features for more effective transfer of articles from the edge of a transfer belt to a moving belt disposed at ninety degrees which excludes inter-link pivoting structure. Thus with specially formed belt edge transfer modular links, a planar edge transfer platform is formed by the upper surfaces of a series of link end and belt edge planar conveyance surfaces located on the respective belt links. The lower link edge surfaces are tapered to reside in non-contact position over the ramp of the receptacle belt formed typically by a sprocket wheel at a position where the planar conveyance surfaces on the two belts are contiguous and co-planar. The link ends are constructed for encountering the dynamic movement conditions and loading stresses encountered when the belt edge is transversed by moving articles traveling from one belt to the other. The underside surfaces at the link end are contoured typically as a circular chord feathered out at the transfer end, and having a set of ridges parallel with the pivot rods. Interdigitatable fingers extending integrally from the upper planar link end surface mate with leading and trailing links for sharing planar and vertical stresses in the cantilevered integral link end-belt edge structure.

40 Claims, 7 Drawing Sheets

TRANSFERRING ARTICLES FROM A MOVING BELT EDGE ONTO A NORMALLY DISPOSED MOVING CONVEYOR BELT

This application is a continuation of Ser. No. 08/541,032 of the same title filed Oct. 6, 1995.

TECHNICAL FIELD

This invention relates to the transfer of continuously moving items from one edge of a moving transfer conveyor belt to a normally disposed moving receptacle conveyor belt, and more particularly it relates to the structure of conveyor belt edges and modular belt links for resolving problems encountered in transferring moving articles in transit from a first moving conveyor belt onto a second conveyor belt moving at a ninety degree angle to the first belt.

BACKGROUND ART

Conveyor belt systems are known in the art that change the direction of travel of conveyed articles abruptly around an ninety degree corner. Conventionally this has been achieved by inserting a dead plate bridge in the spacing between the planar conveying surfaces of two belts axially disposed at a ninety degree angle. Then conveyed articles are urged by the conveying force of a transferring belt at a junction with a curving guard rail to turn the corner and push each other across the dead plate thereby permitting conveyed articles to be moved off the edge of the transfer belt with pushing energy from the transferring belt to be discharged onto a moving receptacle belt oriented at a ninety degree angle which will then carry the articles away.

However, there are many problems presented by such apparatus including the stranding of smaller footprint articles on the dead plate when feed is intermittent, and prevention of changes in transport speed across a transfer region. The articles should not be subject to wobbling, snagging or tipping over when they leave a transfer conveying belt edge surface and are pulled away by the moving receptacle belt.

There are other problems to be overcome in the links and edge structure of the transfer belt in any attempt to make a belt to belt transfer of the articles without an intervening dead plate. For example, if one edge of a transferring belt were to be tapered down to mate with a ramp near the top of a belt pulley on the receptacle belt positioned adjacent the tapered edge, there are significant problems of preventing interference when transfer gaps become small and a need to keep the gap and belt tolerances as tight as possible to prevent transfer problems when moving articles are jumping the gap.

In the transfer belt edge region and on the modular links of the transfer belt, problems of rigidity are presented by cantilevered platforms with tapered edges becoming quite thin at the transfer gap region. Thus if the transported articles are heavy, flexibility of plastic members is a problem. And there are many problems in getting a smooth co-planar surface at the intersection of the belts with two dynamically operable moving belts sensitive to intermittent loading variations such as caused by friction on the belt surfaces when articles are stopped by a guide rail. For example, belts have a tendency to wander laterally and thus would cause serious problems by changing transfer gap spacing between the belts. Also modular link belts, particularly light weight plastic link belts with somewhat flexible pivot rods and link elements can be subjected to flutter and vibration by resonant conditions and during intermittent loading periods. A vertical flutter of individual belt link ends in the transfer gap region can also provide instability problems in discharging the articles. Any differences of behavior of adjacent links of the transfer belt edge in the transfer region thus may introduce problems in the smooth constant speed movement of products through a ninety degree direction change. Any bottlenecking of the articles as they move through the transfer region would also prevent the uninterrupted flow of articles at constant speed along critical conveyor lines in a high capacity conveyance system.

It is therefore an objective of this invention to improve the state of the art of conveyor systems having ninety degree direction changes for in transit articles incoming from a transfer belt and leaving on a receptacle belt by resolving the aforesaid prior art problems.

It is a corresponding objective of the invention to provide improved modular link structure particularly adapted for changing the direction of flow of conveyed articles in a conveyor system for transferring articles off one moving belt edge to another moving belt disposed to convey the articles in a different direction.

DISCLOSURE OF THE INVENTION

This invention provides a conveyor belt system for changing the direction of travel of moving articles in transit by moving the articles off a transfer belt moving in one direction onto a receptacle belt moving in a direction normal to that of the transfer belt. This system employs a curved guard railing for intercepting moving articles on the transfer belt and urging them to push each other across the transfer belt off the belt edge onto a moving receptacle belt for continued transport at the same conveyor speed in the direction normal to movement on the transfer belt.

The belt edge on the transfer belt that discharges the articles onto the receptacle belt is thus formed by a specially constructed modular link for interfacing in non-contact movement across the receptacle belt at a sprocket drive position. This link has a discharge belt edge region comprising a cantilevered planar platform over which articles are moved to be discharged onto a receptacle belt. Thus the link end platform on the bottom surface is tapered to move adjacent to but not in contact with a circular chord ramp portion of the receptacle belt to thereby match co-planar belt-top surfaces on the two belts for transfer of the articles.

For stably supporting articles moving over the discharge edge region of the transfer belt, where the link end conveyance platforms are cantilevered to the main link body, and for solving the aforesaid problems of the prior art, special structure is integrally formed on the transfer belt edge modular links for accommodating the transfer of articles to a receptacle belt. This structure includes interlocking structure for interengaging adjacent link modules in the transfer belt to work as a unit sharing planar and vertical forces and imposed by transferred articles and belt operating conditions to cause reliable belt edge performance. Thus, interconnected special modular belt links act together as a unit for eliminating the foregoing and other difficulties that might be caused by interlink gaps, vibrations, flexing or intermittent load variations that could interfere with the transfer function or cause articles to tip or react to differences in frictional drag when moving across the transfer region in the direction of movement normal to the direction of travel of the transfer belt.

The links are furthermore provided with special structure to prevent belt wander that could cause interference or contact between the two belts in the transfer zone when gaps are small or to expand gap spacings to provide transfer problems.

In general the novel modular link structure afforded by this invention provides two integral link portions, with an edge article discharge portion specially formed for improving the transfer reliability of articles between the transfer and receptacle belts. Some of the particular features of this link end portion comprise, interlocking structure for sharing load stresses with adjacent links in the transfer belt, structure for limiting belt wander in the transfer zone, and interdigitatable fingers on the edge portion that restrict pivot rod passage which serve to prevent planar and vertical movements of the edge platforms away from a coplanar relationship with a fixed gap distance. Ridges parallel to the pivot axis are provided on the contoured underside of the modular link ends which extend parallel to the pivot rods. Flat surface ridges on the planar transport edge portion of the links in the transfer zone are positioned to overlap leading and trailing link members to interlock the belt edge structure to act in concert.

Other features, advantages and objectives of the invention will be found throughout the following description, drawings and claims.

BRIEF DESCRIPTION OF THE DRAWINGS

In the accompanying drawings, wherein like reference characters in the different views designate similar features to facilitate comparison.

THE PREFERRED EMBODIMENTS

Figure 1:
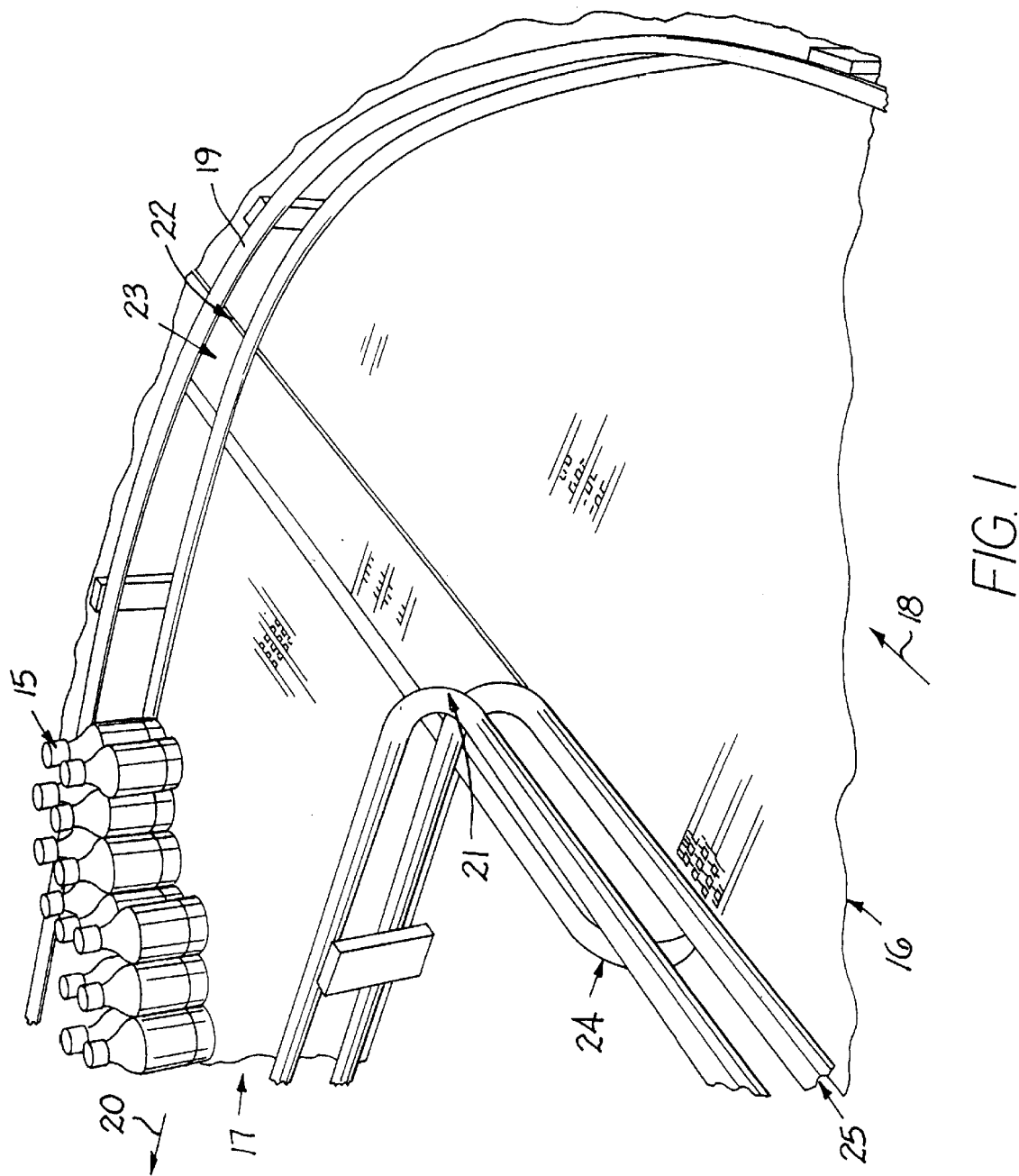
FIG. 1 is a perspective fragmental view of a typical conveyor belt system afforded by this invention for moving articles in transit off a transfer belt moving in one direction onto a receptacle belt moving in a direction normal to the transfer belt.
Figure 2:
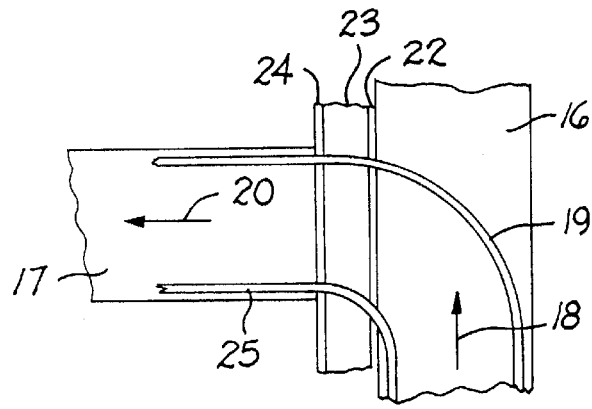
FIG. 2 is a fragmental sketch embodiment of a similar conveyor belt system illustrating functional operation of the conveyor belt system.

As seen in FIGS. 1 and 2, bottles 15 or other articles are conveyed by the primary modular link belt 16 headed in the direction of arrow 18 and by way of the curved guard rail 19 are urged by energy from belt 16 as they impact the outer guard rail 19 to move across belt 16 toward the normally disposed receptacle belt 17 in direction 20. The inner guard rail 21 takes a sharp ninety degree turn at the left edge 22 of belt 16 to pass along the nearer edge of belt 17, and the throat of belt 17 is wide enough to avoid significant bottlenecking as the conveyed articles turn the corner.

In this embodiment, the intermediate belt 23 is employed between the primary belt 16 and the receptacle belt 17 and is identified as a transfer belt with special edge structure 24 functioning as a discharge edge for articles leaving the transfer belt 23. This special edge structure, formed on the left ends of the links in the transfer belt, comprises fewer specially made modular links than would be required in the longer primary belt 16. Also it would have the advantage of permitting a more gradual curve about the rail corner 21 of the nearer guard rail 25 that traverses the intermediate transfer belt 23 before crossing the edge 22 of the primary belt, thereby to provide the planar upper belt surface support for the articles in transit. Optionally, the edge structure could be provided upon the primary belt 16 which would then become the transfer belt, and the intermediate belt eliminated to abut receptacle belt 17 against the left edge 22 of the primary belt 16. In the configuration of FIG. 2, it is seen that as the articles move in transition through the ninety degree direction of travel change, the guard rails 19 and 25 are spaced substantially the same distance apart on lines extending normally from a point on one guard rail to the other guard rail.

Figure 3:
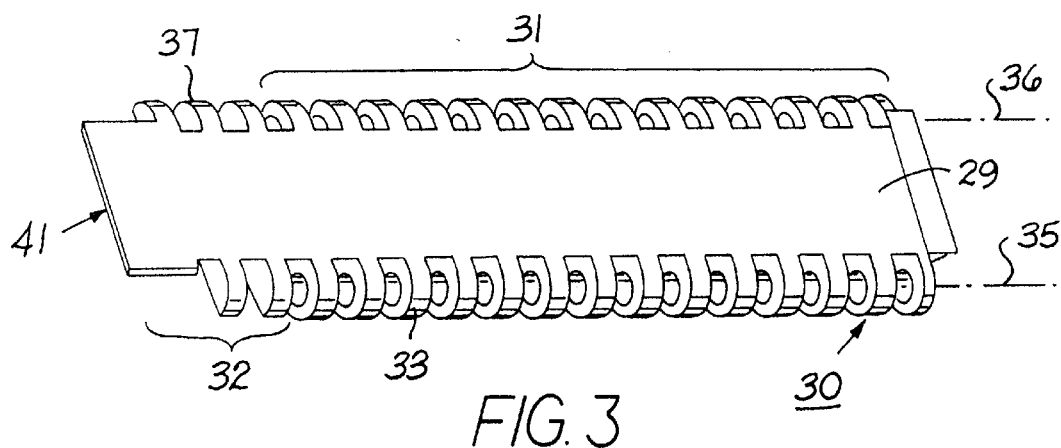
FIGS. 3 and 4 are respectively perspective top and bottom views of a modular belt link embodiment for transfer belts as afforded by this invention characterized by novel belt edge structure specially constructed for effecting transfer of conveyed articles off an edge of a transfer belt onto a receptacle belt disposed to convey articles normally to the direction conveyed by the transfer belt.
Figure 4:
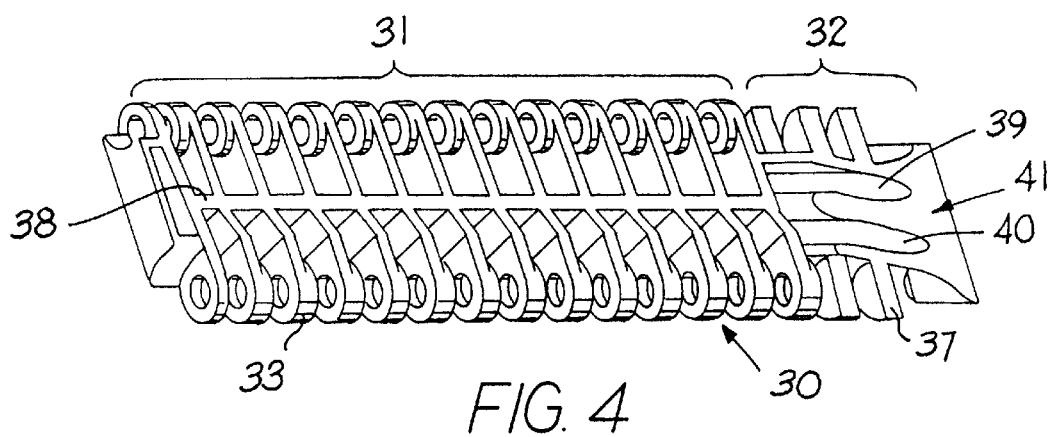

One embodiment of the edge links of the transfer belt structure providing the special edge structure 24 is shown in the respective upper and lower side views of FIGS. 3 and 4. Thus, the top flat planar conveying surface 29 of modular link 30 has a cantilevered article discharge platform 41 extending from the left end as shown in FIG. 3 and the right end of FIG. 4. This planar conveying surface may be either in a grid pattern or constitute the flat plate shown in this embodiment. Preferably the article discharge platform is a solid flat plate that avoids any crevices or interruptions to articles when sliding across the transition region between the two belts, and thus there is less chance of the snagging, tilting or wobbling of conveyed articles in the instant before discharge.

The links 30 have two integral portions 31, 32 respectively forming a conventional link structure portion 31 to be interconnected pivotally end to end in a conveyor belt over only a portion 31 of the link and having a further edge portion 32 dedicated to an integrally formed unpivoted extension article discharge platform portion 32. Thus in the conventional link portion 31 the link ends 33 comprise interdigitatable fingers having pivot rod receiving apertures 34 aligned along the pivot axes 35, 36 on opposite ends of the link 30. The special edge portion 32 has interdigitatable fingers 37 on opposite link ends without pivot rod journalling apertures, thereby blocking a pivot rod. The pivot rod is cut short enough that it extends only through the lined up apertures in the link ends 33 of portion 31. The link ends 33 extend from a transverse support member 38 disposed parallel to the pivot rod axes 35, 36, whereas the fingers 37 on the discharge plate edge platform 41 are integrally attached near the outer edges of the cantilevered surface plate discharge platform 41. Integrally formed ridges 39, 40 are disposed to extend away from portion 31 parallel to the pivot axes along the under surface of the edge portion 32.

Figure 5:
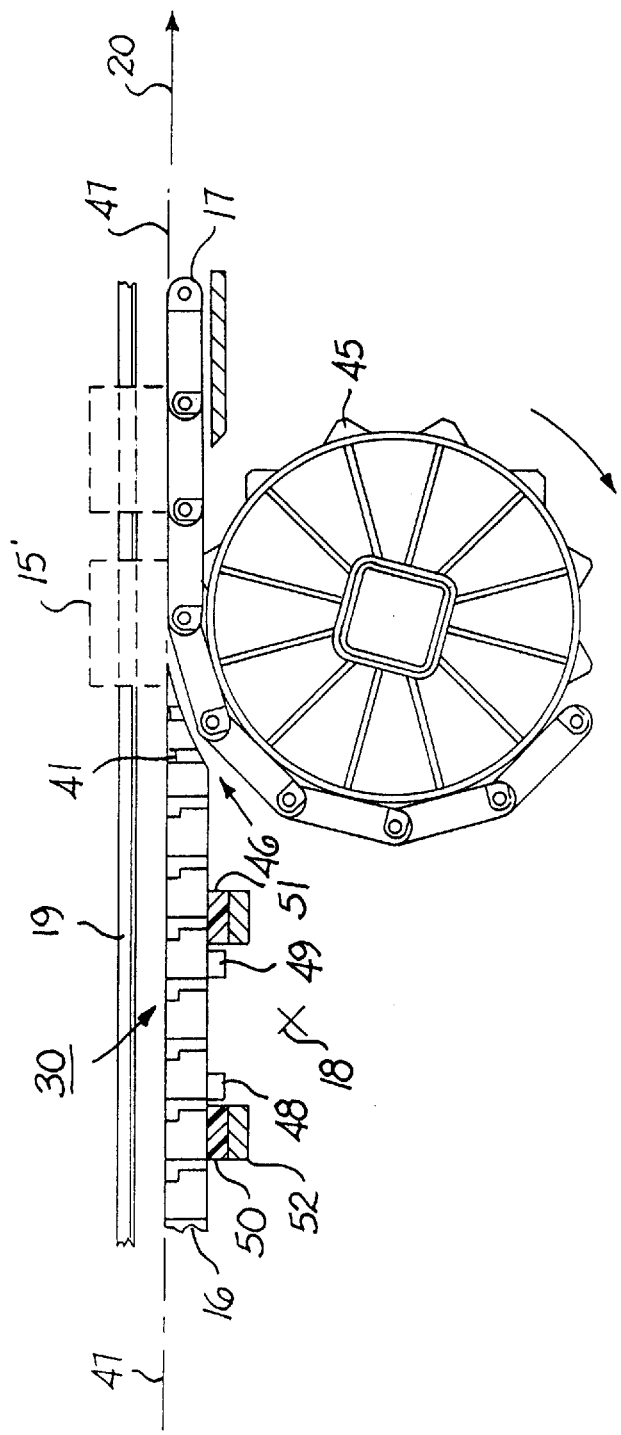
FIG. 5 is a side view sketch, partly in section, illustrating the transfer zone intersection between transfer and receptacle belts disposed to change the direction of movement of conveyed articles by ninety degrees.

The article transfer region 46 is better shown in FIG. 5, wherein the transfer belt 16 (as the tail end of the arrow 18 shows) is moving into the sheet to force by means of the guard rail 19 the articles 15' to be moved toward the right for discharge onto the normally directed receptacle belt 17 moving in the direction 20. The sprocket wheel 45 moves the receptacle belt 17 upwardly over a circular chord disposed in the transfer region 46 to mate in non-contact spacing with the circular chord contoured lower surface of the discharge platform 41. This positions the planar belt conveying surfaces of the two belts 16, 17 in co-planar position along the plane 47 with a narrow gap providing for smooth transition of the articles 15' off the discharge platform 41 onto the receptacle belt 17.

It is seen that there might be problems induced in the mating region 46 for causing instability in the transfer of the articles 15' onto the receptacle belt, or in causing contact with the moving receptacle belt 17 should there be any vertical flexing or lateral movement of the thin tip at the (right hand) extremity of cantilevered mounting of the discharge platform 41. For this reason, the wander control members 48, 49, which can simply be blocks with a flat smooth linear outer surface directed toward wear plate members 50, 51, are integrally formed on the lower surface of the modular links 30 containing the transfer edge discharge platforms 41. The wear plate members 50, 51 are supported on a stably supported portion 52 of an associated mounting assembly (not shown) so that the smooth surfaces meet the wear plate members along a path parallel to the transfer belt edge. It is thus seen that any tendency of the transfer belt 17 to wander right or left in the transfer region 46 will be eliminated and thus the transfer belt edge passes in a straight line path across the receptacle belt 17 ramp in the transfer region 46.

Figure 6:
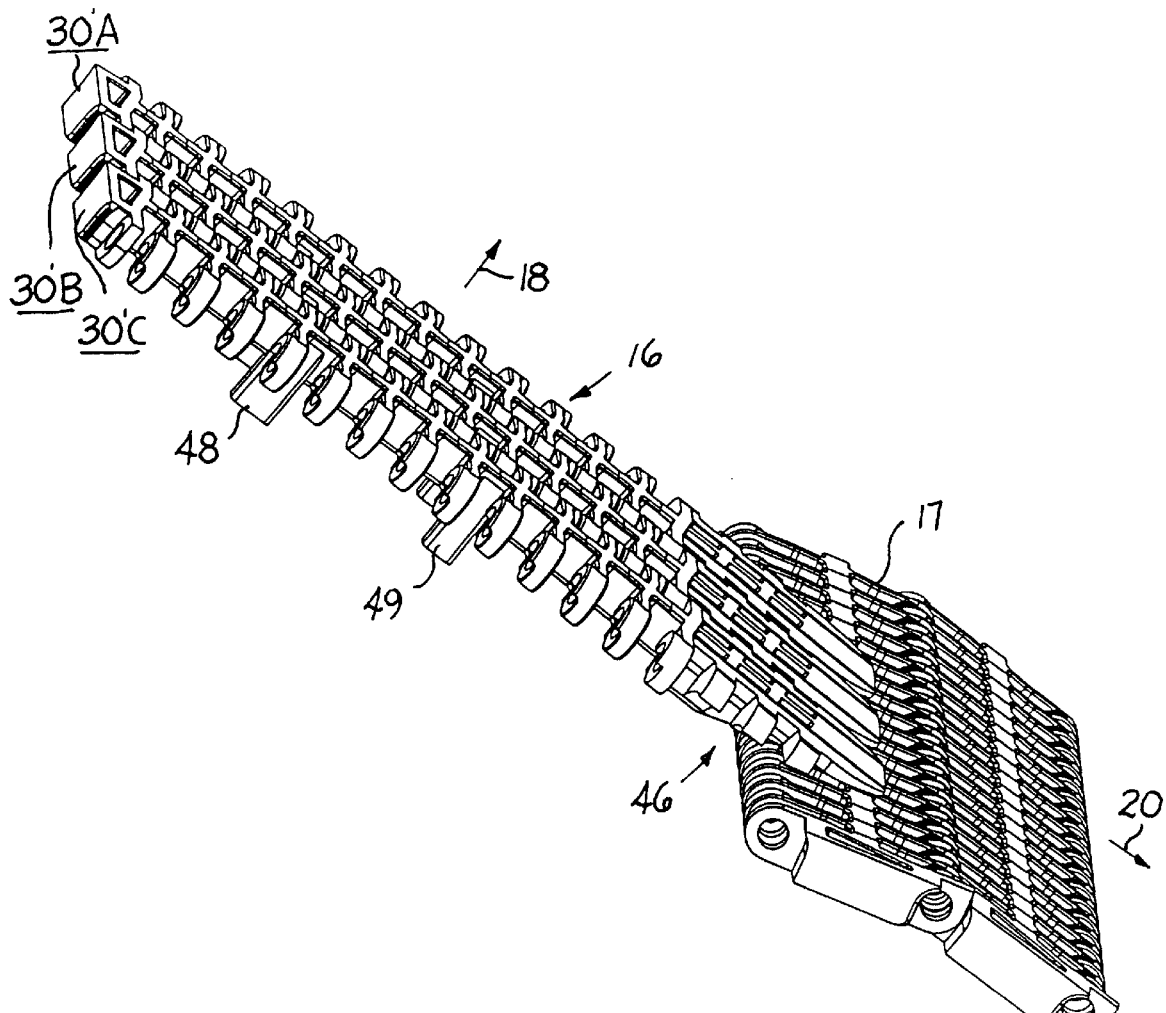
FIG. 6 is a perspective side fragmental view of one belt system and modular link embodiment of the invention illustrating modular link belt edge structure of a transfer belt mating with the upwardly inclined ramp of a receptacle belt for achieving co-planar conveying surface transfer of articles from one substantially planar belt conveying surface on the transfer belt to another substantially planar conveying surface on a receptacle belt.
Figure 7:
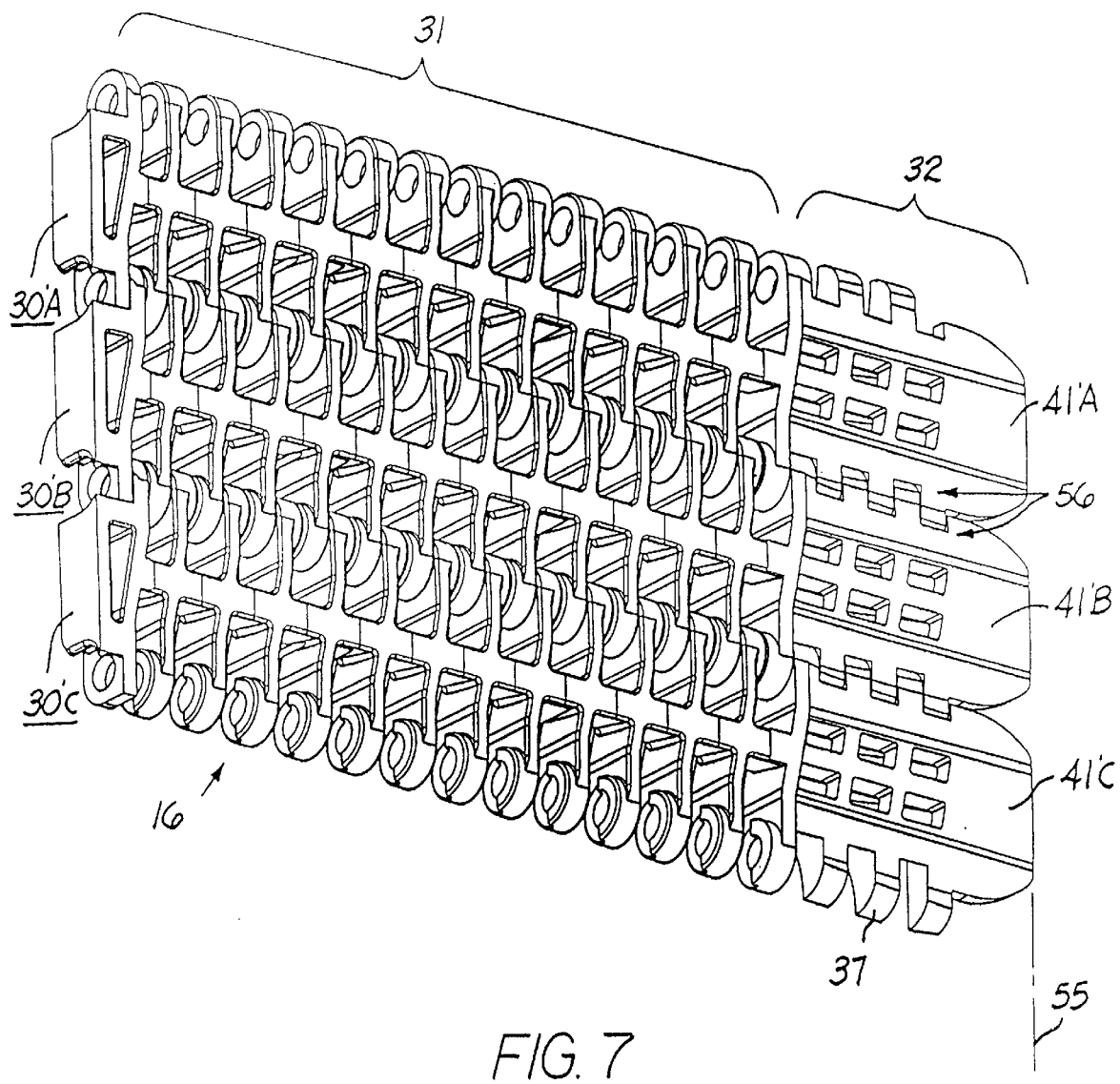
FIG. 7 is a perspective top surface view of several links of the FIG. 6 transfer belt modular link embodiment interconnected in a belt section.

A further transfer belt 16 embodiment with the set of interconnected links 30'A, 30'B and 30'C is shown in FIGS. 6 and 7. As better seen from FIG. 7, it is known that modular link conveyor belts may experience some flutter and ripple between the links, particularly when carrying intermittent loads, and when loads may be intermittently stopped by a guard rail to impose an additional friction drag load. Thus the link end platforms 41 disposed over the transfer edge portion of span 32 could be vertically or jerkily moved to cause instability in the transfer region 46 that could tend to tip or wobble articles being moved onto the receptacle belt 17 if the link end discharge platforms 41 were independent members cantilevered from the belt link portion 31 of separate single links 30. It is thus seen that the interdigitated fingers 37 interlocked with leading and trailing modular links in transfer belt 16 to assure a stable belt edge platform of interlocked link ends 41 that will maintain a straight planar common discharge transfer edge 55 for the transfer belt 16. It is also seen that upper platform surface 41 interlocking structure includes overlaps at the intersections 56 of the platform surface to overly the mating teeth 37 for limiting relative vertical movements between adjacent modular links 30. Thus the adjacent link modules 30'A, 30'B and 30'C share planar and vertical forces within the edge ramped region of platforms 41'A, 41'B and 41'C, whether it comes from belt operation conditions or the effect of moving articles continuously or intermittently across the belt edge transfer region 46.

Figure 8:
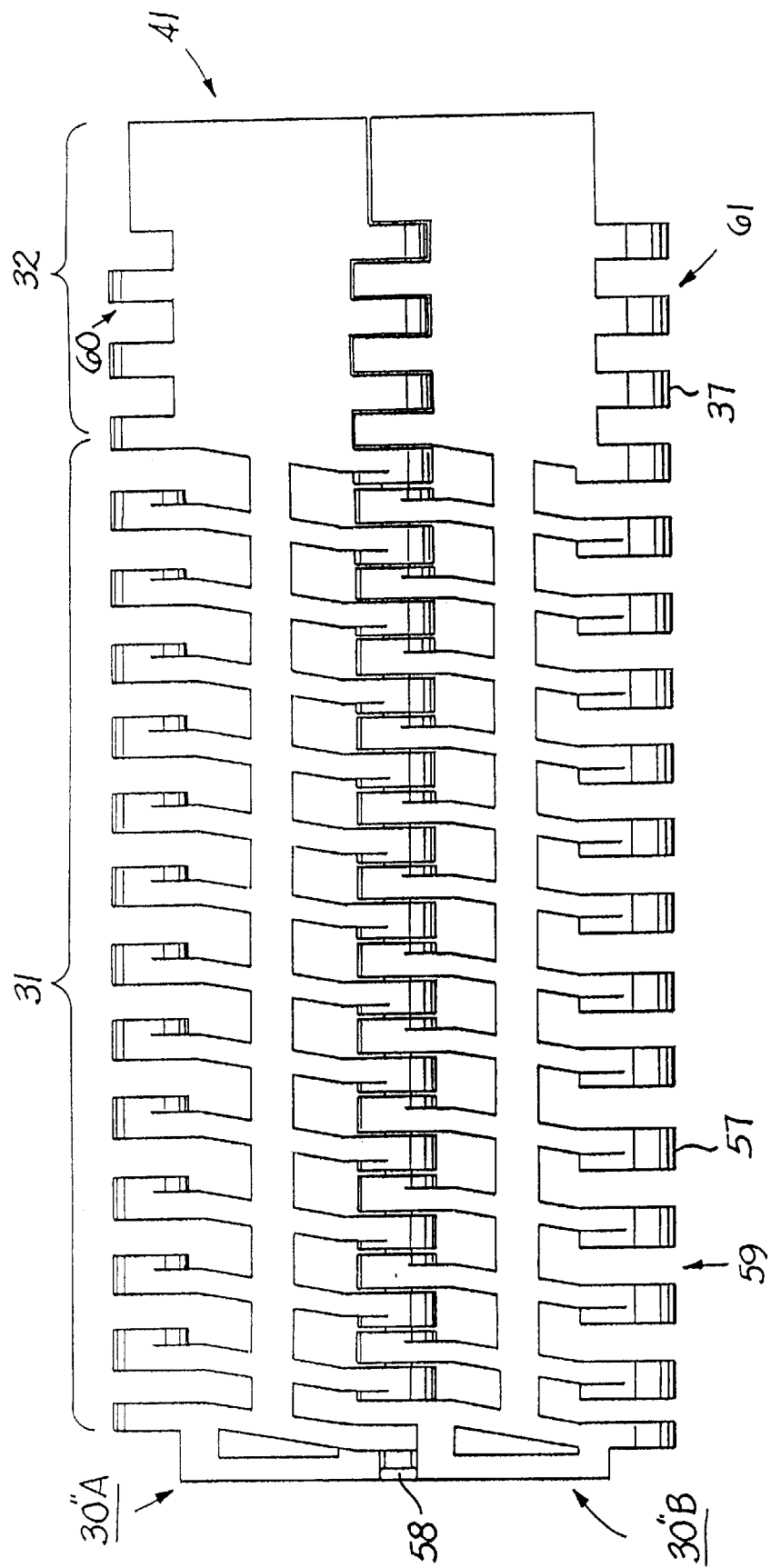
FIG. 8 is a plan top surface view of a further specially constructed transfer belt modular link embodiment of the invention.
Figure 9:
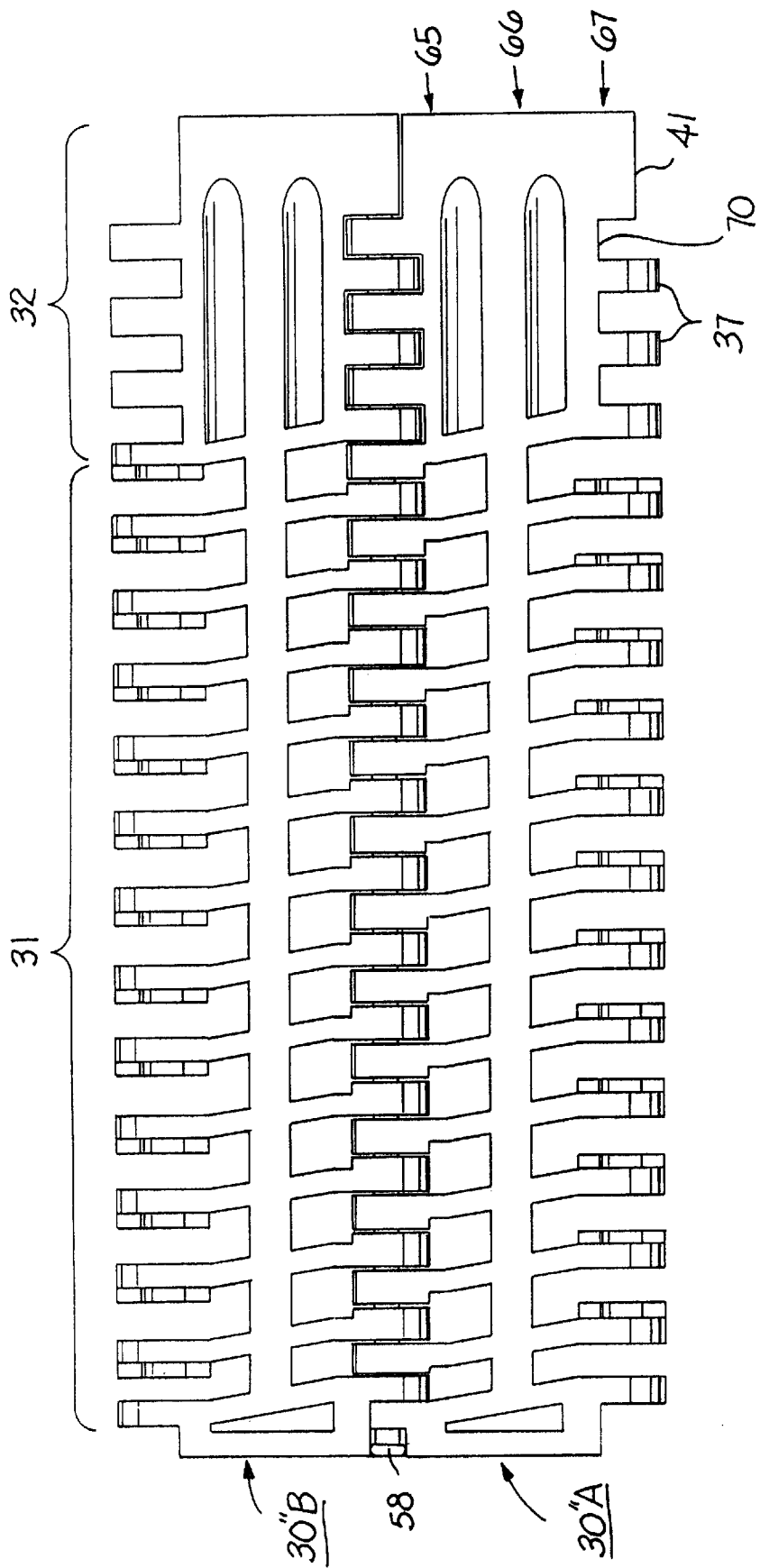
FIG. 9 is a plan bottom surface view of the link of FIG. 8.

The further modular link 30" embodiment of FIGS. 8 and 9 show in more detail the underside configuration of the transfer platform portion 32. In FIG. 8 it is seen that the transfer platform 41 on the upper surface of portion 32 is essentially a flat plate panel article conveying surface made of molded hard plastic having a low coefficient of friction so that conveyed articles will slide readily over it in a direction from the left toward the belt edge portion 32, and off onto the receptacle belt. The conveyor belt portion also has a planar conveying surface albeit in a grid pattern, as provided by the link portions 31 which have interdigitating link end fingers 57 defining a pivot rod (58) journalling path through only the belt interconnecting portion 31 of the link. The transfer platform 41 interdigitating fingers 37 do not have pivot rod journalling apertures 57. Note that two interdigitatable fingers 37 are disposed in the upper link end side 60 of the discharge platforms 41 as shown in FIG. 8 and three fingers 37 are disposed in the lower link end side 61. Thus pivot rods 58 are cut to proper length to extend through the pivot apertures 57 in the portion 31 when the pivot rod 58 is pushed to the right and seated in retaining lips on the two adjacent modular links 30"A and 30"B.

On the under side of the links 30"A and 30"B as shown in FIG. 9, the preferably circular chord tapered or otherwise beveled edge contour of the discharge platforms 41 is cantilevered to the basic belt linking structural portion 31 by integrally molding of the links 30" in a single piece. In each module 30" there are three ridges 65, 66, 67 situated on opposite sides of two grooves disposed parallel to the pivot rod 58 axis, which extend away from a substantially flat plate section of specified thickness, shown on the upper surface. These ridges 65, 66, 67 together with the underside article transfer edge of the flat plate are thus preferably formed about a basic cylindrical chord pattern. The interdigitatable fingers 37 extend from the sides of the outer ridges 65, 67. The flange 70 part of the flat plate upper surface extends far enough into the gaps between the interdigitatable fingers 37 to provide a vertical abutment for restricting vertical movements of the fingers 37. Thus any two adjacent links (30"A, 30"B) are maintained in a side by side co-planar relationship as the conveyor belt discharge edge formed thereby moves across the transfer region for discharging articles off the edge onto a receptacle belt oriented for a ninety degree change of direction of movement of the articles.

Accordingly the novel modular link provided by this invention is adapted to discharge articles moving across the link from one edge when connected in a moving belt configuration. An integrally formed modular link body has a first interlinking portion extending across a portion of the belt to the exclusion of the specially formed belt edge portion.

A second edge portion of the link excludes the pivot rod and is integrally attached and disposed at a common belt edge portion of the link comprising an upper planar article transfer surface constructed to enhance and support the movement of conveyed articles thereacross in a direction normal to the movement of a belt formed of such modules connected pivotably end to end. Thus moving articles are discharged off the edge of the belt from the second edge portion with the load carrying pivot rod interlinking structure for the belt confined exclusively in the first portion. This second portion has appropriate structure for cantilevering integrally from the first portion with an upwardly tapered under surface ending in a thin edge at the upper planar article transport surface, and for unflexibly bearing the weight of transported articles. These edge portions are interlocked with overlapping fingers along the transfer belt edge with those fingers interdigitatably providing a continuous planar surface along the transfer edge. Also the interlinking structure provided for interlocking adjacent second portions of leading and trailing links causes the belt edge links to act in unison and limit individual flexing under load or fluttering in dynamic belt operation.

Accordingly the state of the art is improved and those novel features of this invention setting forth the spirit and nature of the invention are defined with particularity in the following claims.

We claim:

1. In a conveyor belt system for moving articles in transit off a source belt moving in one direction onto a receptacle belt moving in a different direction, the improvement comprising in combination, a modular link source belt disposed for conveyance of articles in a first movement direction on a belt conveying surface, a modular link receptacle belt disposed for receiving articles conveyed on the source belt to move in said different direction on the receptacle belt which presents an entrance ramp tapered upwardly toward an article conveying surface, said entrance ramp being positioned alongside a transfer edge of the source belt for receiving articles discharged from an edge of the source belt, a guard rail system disposed to engage articles conveyed on the source belt for guiding the movement direction of such articles off the edge of the source belt toward the article conveying surface of the receptacle belt, means constructing the source belt with modular belt edge links having a shaped edge ramp configuration on an under side tapered to a thin web surface at the belt edge, said tapered under side being positionable to move dynamically across the entrance ramp with minimal contact to present a small gap width for conveying articles from the source belt to the receptacle belt, and means forming an edge ramp configuration on each source belt modular link with interlocking structural means to engage adjacent link module leading and trailing edges in the source belt thereby providing distribution of weight of transferred articles in transit among a plurality of links along the source belt length for damping dynamic flexing and fluttering of modular link tips individually along the transfer edge of the source belt.

2. The conveyor belt system of claim 1 wherein the edge ramp interlocking structure further comprises: interlocking fingers disposed on leading and trailing edges of each modular link for interdigitating with adjacent links of the source belt configuration.

3. The conveyor belt system of claim 1 disposed upon mounting structure further comprising:

wander control means with a set of lateral wander confining members respectively structurally positioned upon source belt links with corresponding mating wander control means positioned on the mounting structure for maintaining the movement of the source belt transfer edge in a confined path while crossing said entrance ramp.

4. The conveyor belt system of claim 1 wherein the edge ramp configuration on modular source belt links further comprises:

a substantially planar flat panel article conveying surface of a plastic material with low surface friction overlapping the entrance ramp for encouraging conveyed articles to slide laterally toward the receptacle belt entrance ramp.

5. The conveyor belt system of claim 1 wherein the source belt and the receptacle belt are disposed with directions of travel oriented respectively to produce a ninety degree change in the travel path of articles moving off the source belt for further travel along the receptacle belt.

6. The conveyor belt system of claim 1 wherein the belt edge configuration on the source belt modular transfer belt links further comprises: a beveled edge portion having a substantially cylindrical chord shaped contour for mating closely with a cylindrical surface of a sprocket wheel drive at said inclined entrance ramp of the receptacle belt with minimal contact.

7. The conveyor belt system of claim 1 further comprising interlocking means for engaging adjacent source belt link modules along said belt edge comprising a set of interdigitatable fingers disposed parallel to the source belt travel direction for interdigitating with leading and trailing belt link modules to form a load-bearing surface jointly shared between successive link modules disposed along the source belt edge when crossing said entrance ramp.

8. The conveyor belt system of claim 1 wherein the modular links of the source belt further comprise: an integrally formed modular link of predetermined thickness having interdigitatable link ends defining pivot rod receiving apertures along a pivot axis extending partially across the links extending from an article conveying surface thereby forming trailing and leading ends of the link along a first portion of the link, and a transfer edge portion of the link extending from said first portion comprising cantilevered structure integrally formed with the first portion of the link to provide on an upper link side a substantially flat article conveying surface substantially co-planar with the article conveying surface of the first portion of the link, said transfer edge further comprising on a lower link side at the belt edge a tapered contour sloping from the first portion upwardly to reduce the link thickness toward the edge of the transfer belt and disposing an overlapping substantially contact-free mating surface between the source belt and said entrance ramp of said receptacle belt.

9. A conveyor belt modular link for transferring conveyed articles off a transfer belt edge onto a moving receptacle belt for changing the direction of article travel, comprising in combination: an integrally formed modular link for the transfer belt having interdigitatable link ends defining pivot rod receiving apertures disposed along opposite pivot axes extending only partially across the link in a first link portion and forming part of a substantially common conveying surface extending between trailing and leading link ends, said first link portion being integrally affixed to a transfer edge portion of the link extending outwardly toward the transfer edge, said transfer edge of the link having on an upper link side a low friction article conveying surface substantially co-planar with the link conveying surface and providing on a lower link side a tapered surface sloping upwardly from said first link portion toward a thin transfer edge thereby permitting the opposite link edge to overlap said moving receptacle belt and move laterally with little contact across a tapered entrance ramp disposed about a sprocket wheel, and said transfer edge further having integrally disposed structure extending laterally from the link edge tapered surface at leading and trailing edges to form an interlocked transfer belt edge thereby jointly sharing the weights of transported articles with leading and trailing links near said planar belt edge surface as they are discharged from the transfer belt edge and damping flutter and vibration of individual link edges of the modular links.

10. A link as defined in claim 9 wherein said integrally disposed structure further comprises:

sets of interdigitatable fingers extending from opposite link ends in said transfer edge portion of the link disposed for interlocking into end to end coupled links of a conveyor belt presenting said belt edge at said entrance ramp.

11. A link as defined in claim 10 wherein said integrally disposed structure further comprises: limiting means for engaging the fingers in a configuration counteracting independent flutter of the transfer edges of links crossing the entrance ramp.

12. A link as defined in claim 11 wherein the limiting means further comprises a flange extending from a conveying surface in one link to overlap the interdigitatable fingers of an adjacent link thereby to limit flutter and share loading with other limits.

13. A link as defined in claim 9 further comprising integral wander control guide members disposed on the links for presenting smooth confined frictional contact surfaces extending substantially parallel to the direction of travel of articles on the transfer belt for mating with surfaces of corresponding wander control elements disposed external to the link on a separate member oriented substantially parallel to the transfer belt edge.

14. A link as defined in claim 9 wherein the upper surface of the transfer edge portion of the link is substantially an integral flat plate of low friction plastic material.

15. A link as defined in claim 9 wherein the belt edge structure in said transfer edge portion further comprises a set of spaced tapered ridges on the lower link side extending parallel to the pivot axis from the first portion toward the thinner transfer edge.

16. A link as defined in claim 15 wherein said interlocked surface further comprises a set of interdigitatable fingers extending toward link leading and trailing edges respectively integrally affixed to respectively ones of the spaced tapered ridges.

17. A modular link for a conveyor belt adapted to discharge conveyed articles from an edge of a moving transfer belt configuration, comprising in combination:

an integrally formed modular link body having a first portion extending across part of the belt width and a second transfer edge portion, said first portion structured to receive thereinto pivot rods for interlinking the links pivotably end to end into a conveyor belt embodiment, said second transfer edge portion being disposed at one edge of the link presenting an upper article transfer surface constructed to support the movement of conveyed articles in a direction normal to the movement of a belt formed when such modules are connected end-to-end thereby to discharge said conveyed articles off the edge portion of that belt, and tapered transfer edge structure comprising lateral interlocking extensions at leading and trailing positions for interlocking with adjacent edges of adjacent end to end connected link modules to mutually share the loads of articles transferred off said edge and damp individual flutter and vibration of the tapered edge structure of individual links.

18. A link as defined in claim 7 wherein said transfer edge portion further comprises interdigitating fingers extending parallel to the direction of the moving transfer belt adapted to mutually interlock with edge portions of leading and trailing links, thereby to share loads and dampen flutter and vibration at the conveyor belt edge.

19. A link as defined in claim 17 wherein said transfer edge portion further comprises an upper article conveying surface and a lower surface tapered toward a thinner transfer edge and encompassing a plurality of integral tapered ridges disposed parallel to the pivot rods.

20. In a conveyance system for transferring conveyed articles off the edge of the modular link conveyor belt formed of end to end coupled modular links onto a moving transfer belt for conveying the articles in a different direction, the improvements for stabilizing the belt edge to avoid vibration and belt interference in edge transfer regions, comprising in combination:

a tapered belt edge structure on the modular links of the conveyor belt constituting an article transfer station for overlying substantially contact free an entranceway ramp of said transfer belt disposed about a sprocket wheel, said belt edge structure being jointlessly cantilevered to the conveyor belt modular links thereby providing a common upper transfer surface and having an underside tapered edge configuration with at least two tapered fillet ridges disposed perpendicular to the belt edge and integrally affixed to the modular link, and a set of lateral interdigitation fingers disposed on leading and trailing link positions for interlocking adjacent modular links in said conveyor belt together at said belt edge when overlying entranceway ramp to jointly share the load of articles transferred over said article transfer station with adjacent modular links and to damp fluttering and vibration of the belt edge structure of individual links during dynamic conditions of article transport between two belts.

21. In a conveyor belt system for moving articles in transit off a transfer belt moving in one direction onto a receptacle belt moving in a different direction, the improvement comprising in combination, a modular link transfer belt disposed for conveyance of articles in a first movement direction on a planar conveying surface, a modular link receptacle belt disposed for receiving articles conveyed on the transfer belt in said different direction and having an entrance ramp inclined upwardly toward a planar conveying surface, said entrance ramp being positioned alongside one edge of the transfer belt for receiving articles discharged from an edge of the transfer belt, and a guard rail system disposed to engage articles conveyed on the transfer belt for guiding the movement direction of such articles off the edge of the transfer belt toward the planar conveying surface of the receptacle belt, wherein the transfer belt is formed with modular belt edge links having an edge ramp configuration on an under side and a planar conveying surface on an upper side, said edge being disposed to move across and mate adjacent to and with no more than minimal contact with the entrance ramp to produce coplanar planar conveying surfaces on the transfer and receptacle belts, and wherein the edge ramp configuration comprises integrally formed modular belt link extensions on each transfer belt module having interlocking structural means for interengaging adjacent link modules in the transfer belt to form a continuous planar surface along a transfer edge of the transfer belt.

22. The conveyor belt system of claim 21 wherein the edge ramp interlocking structure further comprises: interlocking fingers disposed in the edge ramp configuration of each link for mating into adjacent links to share planar and vertical forces within the edge ramp configuration with adjacent leading and trailing links of a belt configuration.

23. The conveyor belt system of claim 21 disposed upon mounting structure further comprising:

wander control means with a set of wander confining members respectively structurally positioned upon transfer belt links and the mounting structure for maintaining the movement of the transfer belt edge in a straight line path across the receptacle belt ramp without significant wander.

24. The conveyor belt system of claim 21 wherein the belt edge configuration of the modular transfer belt links further comprises:

a substantially planar flat panel article conveing surface of a plastic material with low surface friction for encouraging conveyed articles to slide laterally across the panel.

25. The conveyor belt system of claim 21 wherein the transfer belt and the receptacle belt are disposed with directions of travel oriented respectively to produce a ninety degree change in the travel path of articles moving from the transfer belt to travel along the conveyor belt conveying surface.

26. The conveyor belt system of claim 21 wherein the belt edge configuration on the modular transfer belt links further comprises:

a beveled edge portion having a contour for mating closely with said inclined entrance ramp of the receptacle belt without substantial contact.

27. The conveyor belt system of claim 21 further comprising interlocking means for engaging adjacent transfer belt link modules disposed in said belt edge configuration including a set of interdigitatable fingers disposed toward and away from the transfer belt travel direction for interdigitating with adjacent belt link modules structurally to form a joint coplanar surface between successive link modules disposed along the transfer belt edge for limiting vertical deflection.

28. The conveyor belt system of claim 21 wherein the modular links further comprise: an integrally formed modular link of predetermined thickness having interdigitatable link ends defining pivot rod receiving apertures along a pivot axis extending partially across the link and extending in directions away from a substantially planar conveying surface to form trailing and leading ends of the link along a first portion of the link excluding a link edge portion of the link of different configuration, said link edge portion comprising cantilevered structure integrally formed with the first portion of the link to provide on an upper link side a substantially planar conveying upper surface substantially coplanar with the conveying surface of the first portion of the link and comprising on a lower link side of said edge ramp a tapered contour sloping upwardly toward the planar conveying surface thereby reducing the link thickness toward the edge of the transfer belt for permitting the link edge portions to overlap and move across an entrance ramp of said receptacle belt positioned adjacent said opposite link edge without substantial contact.

29. The conveying belt system of claim 21 wherein said interlocking structural means comprises structure formed in said belt link extensions for retaining a planar relationship with adjacent corresponding link edge portions of leading and trailing links in a conveyor belt under dynamic loading stresses imposed upon a moving belt when conveyed articles are transported across the opposite link edge onto the receptacle belt.

30. A conveyor belt modular link for transferring conveyed articles off a transfer belt edge onto a moving receptacle belt for changing the direction of article travel ninety degrees, comprising in combination: an integrally formed modular link of predetermined thickness having interdigitatable link ends defining pivot rod receiving apertures disposed along a pivot axis extending only partially across the link and forming part of a substantially planar conveying surface extending between trailing and leading ends, said link ends and pivot axis being integrally affixed to a second portion of the link devoid of pivot rod receiving apertures extending therefrom to one link edge, said second portion of the link forming one link edge integrally extending from the first portion of the link to provide on an upper link side a substantially planar conveying surface co-planar with the conveying surface of the first portion of the link and providing on a lower link side a tapered contour sloping upwardly through the thickness of the link toward the planar conveying surface thereby reducing the link thickness toward said opposite link edge for permitting the opposite link edge to overlap and move without substantial contact across a circular chord path taken by said receptacle belt, and said second portion having integrally disposed structure to form a continuous planar transfer belt edge surface extending over adjacent links for bearing the weight and encouraging the movement of articles across said planar belt edge surface for discharge from the transfer belt edge.

31. A link as defined in claim 30 further comprising:

sets of interdigitatable fingers extending from opposite link ends in said second portion of the link disposed for interlinking two contiuous planar surfaces of the second portion in adjacent end to end coupled links of a conveyor belt to form a common planar load bearing surface disposed on successive links.

32. A link as defined in claim 31 wherein said planar conveying surface of the second portion of the link further comprises: limiting means for interlocking with the fingers in said second portion of the links adapted to engage adjacent links in a configuration counteracting vertical deflections of the tapered belt edge structure.

33. A link as defined in claim 32 wherein the limiting means further comprises a flange extending from the planar conveying surface in one link to overlap the fingers in an adjacent link.

34. A link as defined in claim 30 further comprising integral wander control guide members disposed on the links presenting smooth linear contact surfaces extending in an end to end direction normal to said pivot axis for mating with surfaces of corresponding wander control elements disposed external to the link on a separate member oriented parallel to the transfer belt edge.

35. A link as defined in claim 30 wherein the upper surface of the second portion of the link is substantially a flat plate.

36. A link as defined in claim 35 wherein the second portion of a link is disposed to intereengage second portions of leading and trailing adjacent links when connected in a belt to present in concert a continuous transfer belt discharge edge.

37. A link as defined in claim 30 wherein the upper surface of the first portion of the link comprises a planar conveying surface defined by link ends attached to a lateral supporting member disposed parallel to the pivot axis.

38. A link as defined in claim 30 having integrally formed thereon in said second portion conveyor belt edge structure for sharing a planar relationship with adjacent corresponding second portions of leading and trailing links of the transfer belt and for maintaining the planar relationship when encountering dynamic loading stresses imposed upon a moving belt as conveyed articles are moved across the second portion onto the receptacle belt.

39. A link as defined in claim 30 wherein the belt edge structure in said second portion further comprises a set of spaced ridges on the lower link side extending parallel to the pivot axis from the first portion toward the opposite link edge.

40. A link as defined in claim 39 further comprising a set of interdigitatable fingers extending toward link leading and trailing edges integrally affixed to respective ones of the spaced ridges in said set.

* * * * *